United States Patent [19]

Hulsey

[11] Patent Number: 4,665,946
[45] Date of Patent: May 19, 1987

[54] ROTARY CONTROL VALVES WITH PRESSURE-REDUCING MEANS

[75] Inventor: Eldon E. Hulsey, Houston, Tex.

[73] Assignee: Daniel Industries, Inc., Houston, Tex.

[21] Appl. No.: 770,967

[22] Filed: Aug. 30, 1985

[51] Int. Cl.[4] .............................................. F16K 47/04
[52] U.S. Cl. .......................... 137/625.3; 137/625.32; 251/127; 251/209
[58] Field of Search ................ 251/117, 127; 251/209; 137/625.3, 625.31, 625.32, 625.47

[56] References Cited

U.S. PATENT DOCUMENTS

| | | | |
|---|---|---|---|
| 1,623,248 | 4/1927 | Joseph et al. | 137/625.32 |
| 1,968,391 | 7/1934 | Hamilton | 137/625.47 X |
| 4,212,321 | 7/1980 | Hulsey | 137/625.32 |

FOREIGN PATENT DOCUMENTS

| | | | |
|---|---|---|---|
| 2458321 | 6/1976 | Fed. Rep. of Germany ... | 137/625.3 |
| 14487 | of 1889 | United Kingdom ........... | 137/625.31 |

*Primary Examiner*—Arnold Rosenthal
*Attorney, Agent, or Firm*—Michael P. Breston

[57] ABSTRACT

The rotary control valve comprises a casing having a pair of axially-opposed ports. A valve chamber is rotatably mounted in the casing. A stem adjustably rotates the valve chamber for controlling the flow through the ports. The valve chamber has a pair of axially-opposed, off-center orifices, each being contiguous to and movable into and out of partial and full registration with its associated port. An off-center tube is disposed inside chamber and extends between the orifices. A pressure-reducing medium in the valve chamber. The medium includes a plurality of stacked, axially-spaced discs, each having a pattern of axial holes for dividing the flow thereacross.

25 Claims, 16 Drawing Figures

ROTARY CONTROL VALVES WITH PRESSURE-REDUCING MEANS

BACKGROUND OF THE INVENTION

1. Field of the Invention

The present invention relates generally to control valves and, more particularly, to such valves that are associated with a pressure reducing medium for minimizing damaging cavitation effects and for controlling line pressures.

2. Description of the Prior Art

A fluid flowing through a transmission system, such as a pipeline, possesses both potential energy (pressure) and kinetic energy (velocity). A rotary control valve installed in a pipeline can effectively control the pressure, volume, and/or the velocity of the fluid flowing through the pipeline. As the flow is throttled through the valve's restricted orifice, its velocity increases and reaches a maximum value at a point at which minimum pressure occurs.

But increasing flow velocities tends to create in the pipeline system excessive noise, flashing, cavitation, erosion, vibration, and/or flow instability. Thus, cavitation occurs when the pressures on the opposite sides of the valve's orifice are above the liquid's vapor pressure, but the minimum pressure drops to below the liquid's vapor pressure. Then bubbles form at the point of minimum pressure and move downstream to the point of pressure recovery where they implode. Under other pressure conditions, flashing occurs, and the generated bubbles do not collapse downstream.

Also, it is believed that sonic flow of gases and vapors creates high noise levels as a result of shock waves, which impinge on the slower moving fluid downstream of the control valve.

In U.S. Pat. No. 3,424,200 is disclosed a rotary disc valve having a tapered arcuate orifice which regulates flow according to the adjusted position of the disc. A plurality of small axial holes are provided around the edge of the orifice such that only a very small portion of the flow can take place through these holes. It is alleged that the very limited flow through these holes can avoid some of the undesirable cavitation effects due to the implosions of the bubbles downstream of the orifice disc.

In my U.S. Pat. No. 4,212,321 is described a spherical control valve which is rotatably mounted inside a spherical casing. The control element has an axis of rotation which is coaxial with the casing's main axis. Extending through the valve's pressure-reducing medium, along a diameter thereof, is a straight tube. A pair of elongated tapered orifice slots extend circumferentially in opposite directions from the opposite open ends of the tube. These slots form a straight flowway between the inlet and outlet flow ports. In the fully-open position, the tube becomes in alignment with the diametrically-opposed inlet and outlet ports. In its preferred embodiment, the entire wall of the tube is perforated and is surrounded by a perforated sleeve which acts as a pressure-reducing medium. But the tube's perforated wall becomes itself subjected to great stresses due to the large pressure drops thereacross. Also, because the tube's axis makes an acute angle with the axis of rotation, (1) the valve's casing must be made sufficiently large and heavy to provide the necessary reaction torques, and (2) undesirable turbulence and vibration occur.

In other well-known cylindrical and spherical control valves utilizing a pressure-reducing medium, fluid flows only through a small portion of the medium as the fluid barely starts to flow. For high velocity flow, the available pressure reducing medium is at a minimum, which creates excessive noise. In the fully-open position, the full bore flow becomes curved, which creates turbulence. In other such known valves, the full bore flow is through the entire pressure-reducing medium even when the flowway is fully open, resulting in destructive pressure drops, which were considered unavoidable.

For the above and other well-known reasons, known rotary control valves create a constant need to maintain a large inventory of spare parts to keep them operational, and sometimes to surround them with noise-suppressing structures, especially when they are operated close to inhabited areas, where strict environmental codes exist.

The spare part problem is very serious because in many parts of the world they are not available and must be flown in from far away places.

In sum, known control valves of the foregoing types are noisy, cumbersome, utilize excessive energy, are expensive to maintain, and require an excessive inventory of expensive replacement parts.

The objects of the present invention include the following: to provide a new and improved rotary control valve which allows through-conduit, unobstructed, undivided, straight flow when the valve control element is fully open; which allows parallel laminar flow through the entire body of a pressure-reducing medium for the entire flow regardless of volume; which features a substantially balanced, linear, dynamically-stable, and high-resolution flow over a wide throttling range up to 315°, and which can be constructed and operated at only a fraction of the corresponding costs for making and operating conventional such rotary control valves having comparable low noise level characteristics.

SUMMARY OF THE INVENTION

The rotary flow control valve of this invention comprises a casing defining a generally cylindrical, internal receptacle which has a pair of inlet and outlet ports. A rotatable stem extends through the center axis of the casing. A cylindrical valve control element is mounted on the stem for rotation therewith. The valve control element includes a hollow housing having an upstream circular orifice plate with an inlet orifice and a downstream circular orifice plate with an outlet orifice. A tubular member extends between the orifices and is in full registration with the opposite flow ports when the valve control element is in its fully-open position. A pressure-reducing medium is disposed around and surrounds the external wall of the tubular member to cause a tortuous flow therethrough in the valve's throttling positions.

DESCRIPTION OF PREFERRED EMBODIMENTS

To facilitate the description, similar parts will sometimes be designated with the same numerals followed by a prime ('), and for the sake of simplicity will not be described, except when desirable.

Figure 10:
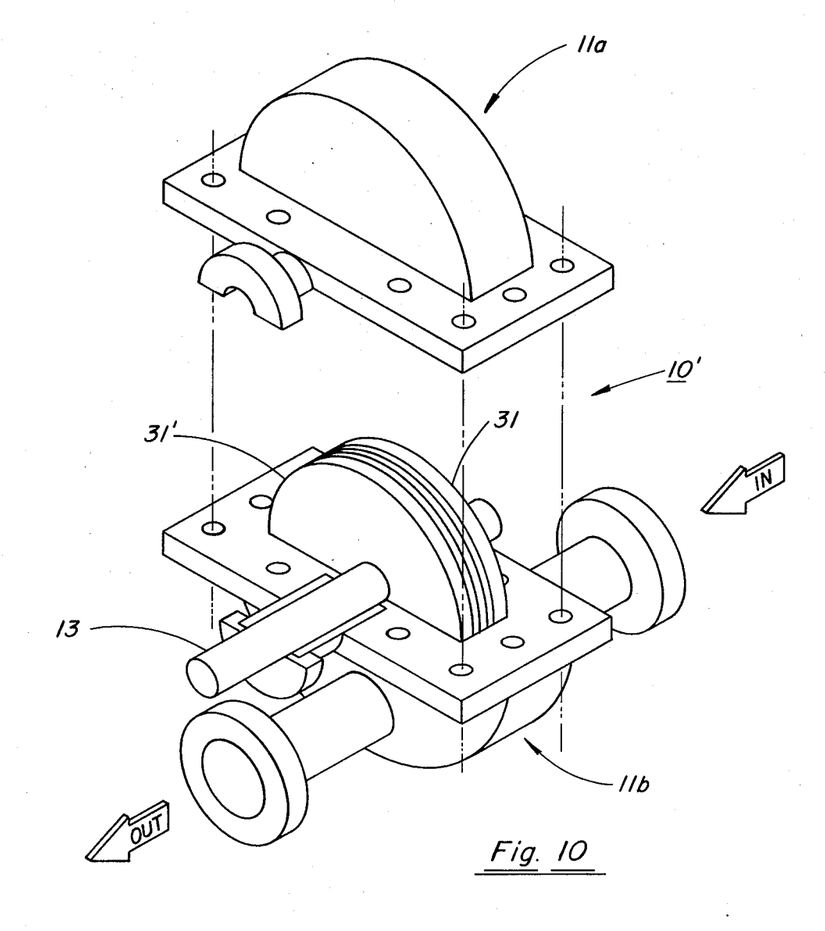
FIG. 10 is an exploded view of the valve of this invention having a split casing for easy removal of the valve control element from a pipeline without first having to uncouple the valve casing from the pipeline.

Throughout the drawings, the valve of this invention is generally designated as 10. In FIGS. 1–9 the valve has a unitary casing or housing 11 which, in one embodiment, includes a generally-cylindrical, internal receptacle 12 having a valve stem 13 which has an axis of rotation 13'. The casing can be a split casing having two complementary casing parts 11a and 11b as shown in FIG. 10. Stem 13 extends through axial thrust bearings 14, 14' housed respectively in an inlet circular bonnet 15 and in an outlet circular bonnet 16, separated by a cylindrical sleeve 17, and held together by bolts 18.

Casing 11 has a circular inlet flow port 20 in bonnet 15 and a circular outlet flow port 20' in bonnet 16. External conduits 22, 22' and end flanges 23, 23' connect valve 10 to pipeline flanges (not shown). Ports 20, 20' and conduits 22, 22' can have circular bores of the same diameter and a common longitudinal axis 24 which is radially offset from but parallel to the axis of rotation 13'.

A cylindrical valve control element 30 is disposed inside receptacle 12 and is fixedly mounted on shaft 13 for rotation therewith. Control element 30 comprises an upstream inlet circular orifice plate 31, a downstream outlet circular orifice plate 31', and an outer cylindrical sleeve 33 therebetween, all mechanically connected together to form a pressure-reducing, cylindrical chamber 34. A radial, differential-pressure orifice 33' balances the pressures across the inner and outer cylindrical walls of sleeve 33.

Orifice plates 31 and 31' are parallel to each other and perpendicular to rotation axis 13'. Plates 31, 31' can have identical inlet and outlet, transverse arcuate orifices 36, 36', respectively, which are radially offset from rotation axis 13'. Orifices 36, 36' are contiguous to and move over their associated flow ports 20, 20', respectively.

Each orifice 36 can be characterized by a nearly circular main aperture 37 followed by a progressively-tapered, arcuate channel 38, which extends generally circumferentially from aperture 37 about axis 13' for a predetermined angular range. Orifices 36 and 36' can be (but need not be) identical when viewed from inlet port 20, and they extend in the same angular direction about axis 13'.

The angular lengths of orifices 36, 36' can be equal and can be less or greater than 90°. These angular lengths have a range preferably from about 180° to about 270° and even up to 315°. When valve control element 30 rotates about its rotation axis 13' through an angle of about 315°, it provides a high $C_v$, a wide rangeability, and a high turndown-ratio range from valve closed to valve open positions.

Apertures 37 and 37' are coaxial and each one of channels 38, 38' is formed by a pair of arcuate walls 39, 39', which are inclined inwardly and converge to form a trailing end 41. The remainder of plate 31 or 31' is solid and non-slotted. The solid portion of plate 31, between aperture 37 and trailing end 41, forms a valve closure seat 42. The width of channels 38, 38' changes gradually with the rotation of stem 13.

Figure 4:
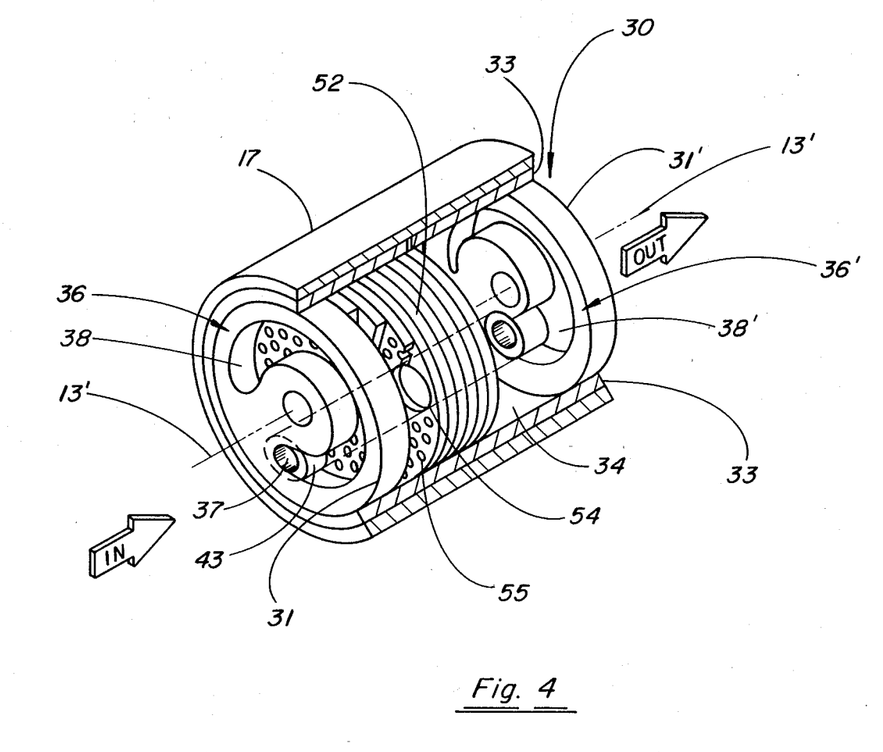
FIG. 4 is an isometric, partly-sectional view of the valve control element with upstream and downstream ports of different shape.
Figure 5:
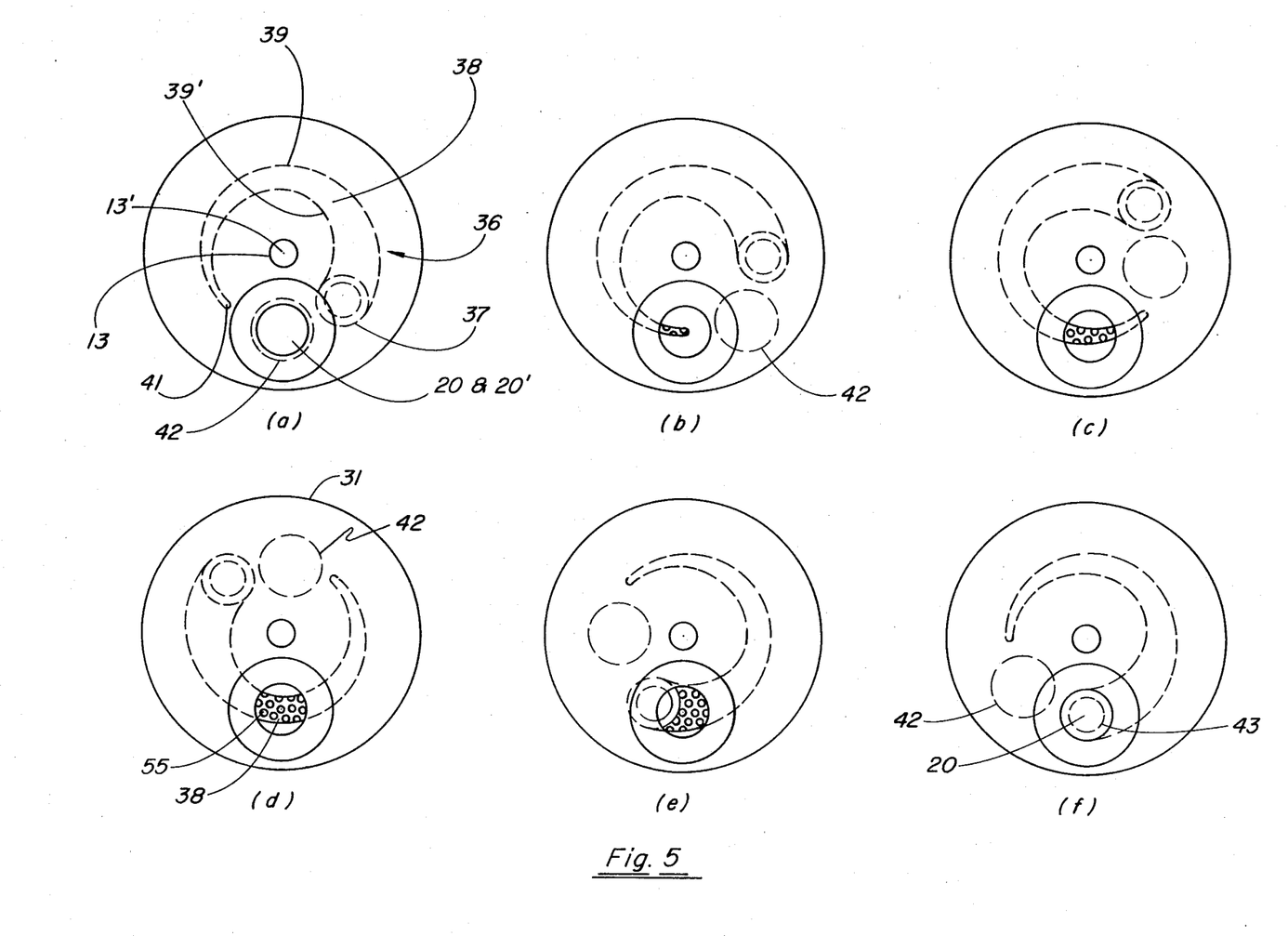
FIGS. 5a–5f show different throttling positions of the orifices of the valve shown in FIG. 3 ranging from fully-closed to fully-open.
Figure 6:
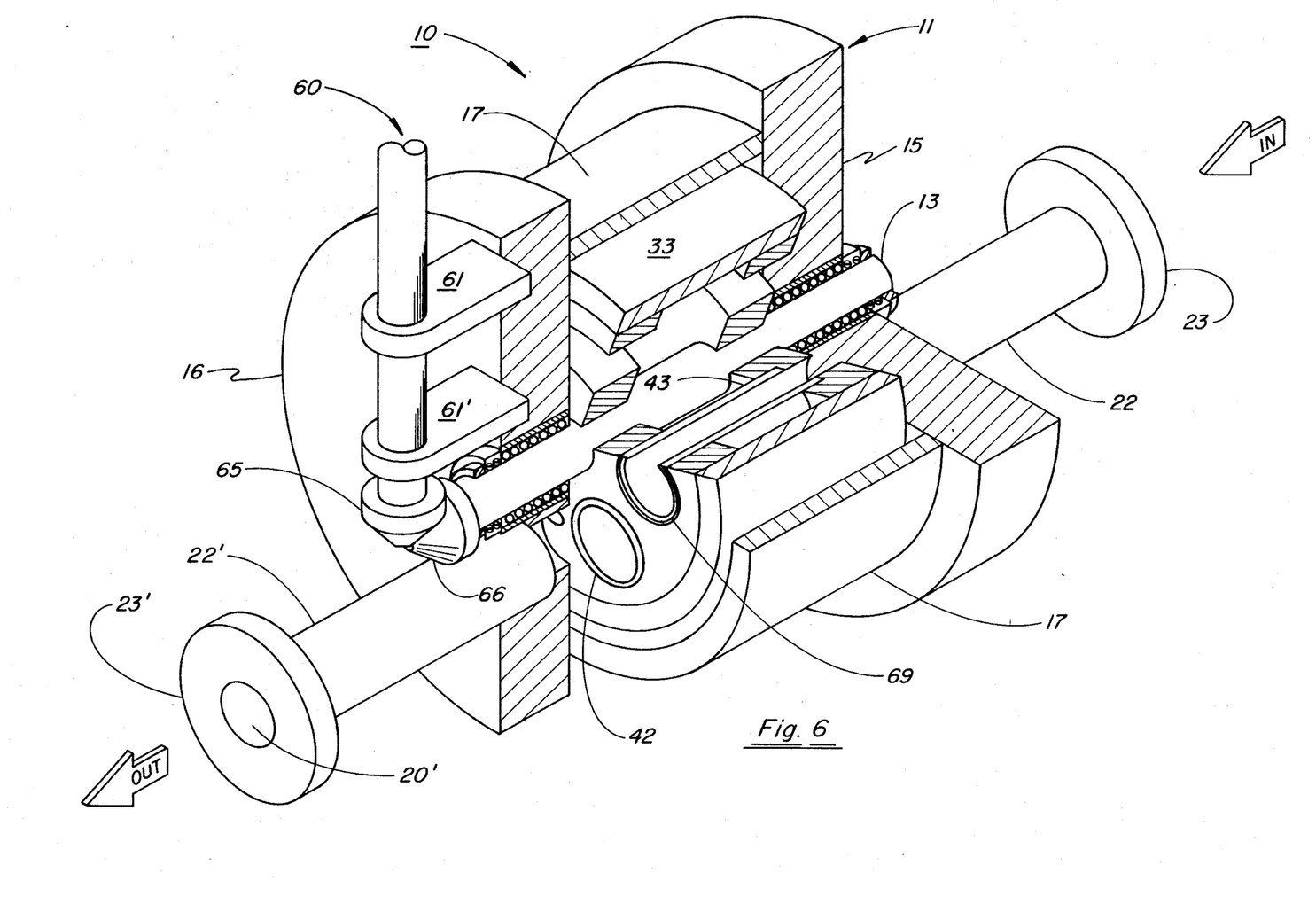
FIG. 6 is an isometric partly-sectional view of the valve shown in FIG. 2 but without a pressure-reducing medium.

Interchangeable orifice plates 31, 31' can be provided with differently shaped and sized orifices 36, 36' to accommodate a wide range of flow patterns (linear or equal percentage), and of pressure drops. Orifice 36 can, for example, be full bore throughout, as shown in FIG. 4, wherein the width of channel 38 is constant and equal to the diameter of aperture 37, whereas orifice 36' has the shape as previously described.

A straight, non-perforated, tubular member 43, having a cylindrical bore 43' which is equal in diameter to that of flow ports 20, 20', establishes a straight, direct, full-bore flowway 24' when the tube's bore 43' is in full registration with flow ports 20, 20'. Flowway 24' has an axis which is parallel to the rotation axis 13'.

The amount of energy lost by the fluid, as it flows through chamber 34 in valve 10 (FIGS. 1–9) or in valve 10' (FIG. 10), is controlled by a pressure-reducing medium 50 of a designated material selected to fit any design criteria. This pressure-reducing medium 50 could consist of the following: a retainer plate 45 with holes 46 (FIG. 9); balls or spheres 51 (FIG. 1) of various materials, quantity and diameter; stacks of spaced discs 52 with various sizes and numbers of perforations 55 in each disc; convoluted plates 56 of various shapes and configurations (FIGS. 7, 8) which are welded together to have axial holes 57; and other such materials and configurations that will reduce the pressure as required for a specific fluid flow application.

All embodiments of pressure-reducing medium 50 cause the flow to be divided and then remixed. In each pressure-reducing medium 50, the perforations are offset from one stage to the next, so that turning forces are required to push the flow through consecutive stages in the medium.

For gas and steam flow, these perforations are gradually increased in the direction of flow in order to avoid high velocities. The fluid expands in stages as it flows toward discharge port 20'.

Figures 1, 9:
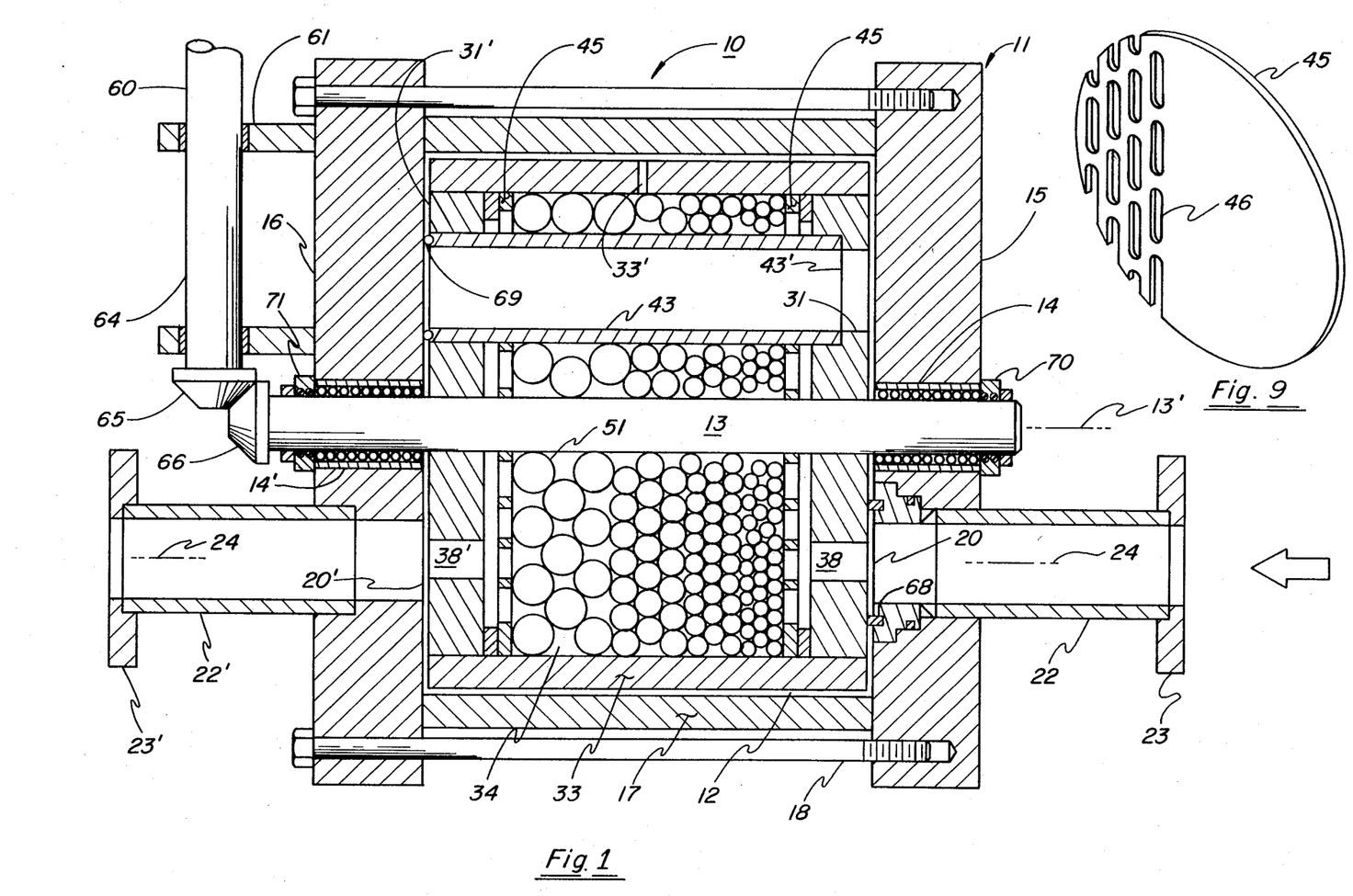
FIG. 1 is a longitudinal, cross-sectional view showing a control valve embodying the present invention, the valve being in its throttling position and showing a pressure-reducing medium having a matrix of various sizes of solid balls such as spheres.
FIG. 9 is an isometric view of the retaining member used to retain the balls in FIG. 1.
Figure 2:
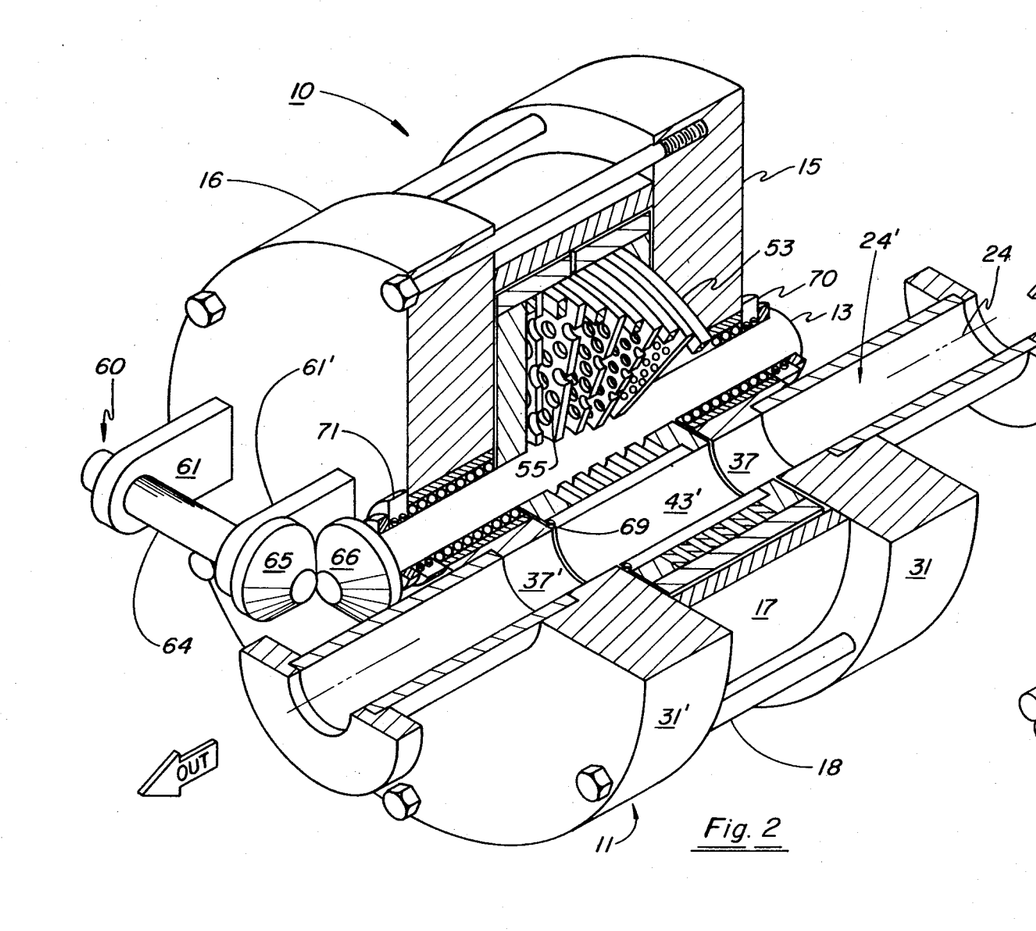
FIGS. 2 and 2a show an isometric view of the valve with a 90° cutout, the valve being shown in its full-bore open position and having a pressure-reducing medium consisting of perforated circular plates.
Figure 2A:
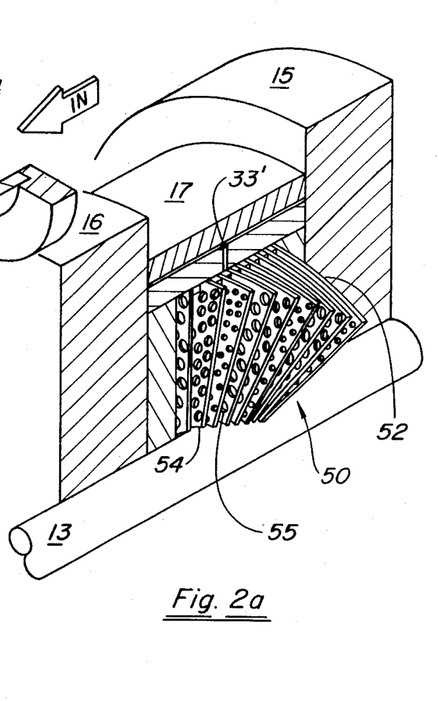
Figures 3, 7, 8:
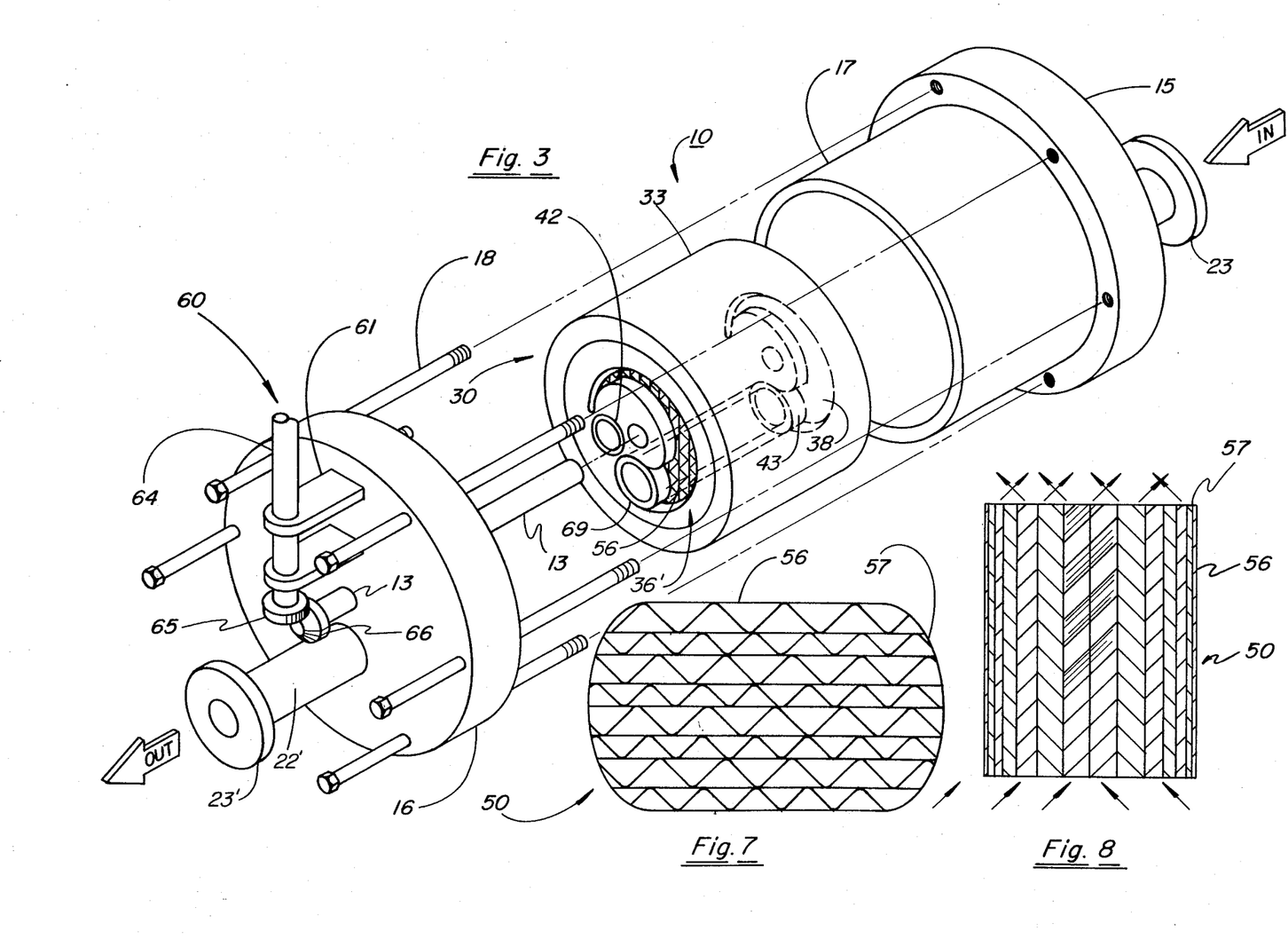
FIG. 3 is an isometric exploded view of the valve wherein the pressure-reducing medium has a convoluted-plate body.
FIGS. 7 and 8 are diagrammatic representations of different convoluted plate bundles which can be used as the pressure-reducing medium.

The stacked discs 52 are spaced from each other by annular spacers 53 (FIG. 2). Each disc 52 has an axial circular bore 54 for accepting therethrough tube 43, which is welded to discs 52 for rotation therewith.

Perforations 55 can have progressively reduced diameters on adjacently-facing discs in the direction of fluid flow. For liquid flow, all the perforations are preferably equal in size.

Body 56 can have parallel axial holes 57 of equal size (FIG. 7) or of progressively-reduced, sectional areas (FIG. 8) in the direction of flow.

A driver mechanism 60 is mounted on a bracket 61 which can be conveniently secured to bonnet 15 or 16. Driver 60 (FIG. 3) is adapted to rotate stem 13, and therefore control element 30, relative to casing 11 from fully-closed to fully-open valve positions. Driver 60 includes a shaft 64 having a bevel gear 65 which meshingly engages a drive gear 66 coupled to stem 13. Any other suitable means, including remote control means, can be employed for rotating stem 13.

Stem 13 is made fluid tight, as it extends through circular bonnets 15 and 16, by stem seals 70, 71. Outlet port 20' is sealed off by valve seat 42 on orifice plate 31' (FIG. 5a) when control element 30 is in its fully-closed position. Inlet port 20 is sealed off by orifice seal 68 on orifice plate 31.

As stem 31 is being slowly rotated, control element 30 also rotates therewith from its closed position (FIG. 5a) to its fully-open position (FIG. 5f), and a progressively larger flow takes place through the trailing end portions of channels 38, 38', which become contiguous to and ride over inlet and outlet flow ports 20, 20', respectively.

The flow is gradually increased as successively wider portions of orifices 36, 36' become aligned with flow ports 20, 20'. Flowway 24' offers full-bore flow upon full registration of bore 43' of tubular member 43 with flow ports 20, 20'.

Because variable orifices 36, 36' can have a rotation range of up to 315° between fully-open and fully-closed positions, valve 10 allows a considerably wider range of flow coefficient $C_v$ than conventional valves.

When valve 10 approaches its fully-open position (FIG. 5e), a portion of bore 43' of tube 43 and a portion of channel 38 become exposed to inlet port 20, which causes flow to be divided between them. The portion which flows from inlet port 20 into bore 43' flows directly into outlet port 20', while the portion which flows into channel 38 flows through the entire pressure-reducing medium 50, channel 38', and then flows out through outlet port 20'.

When control element 30 is rotated to its fully-open position (FIGS. 2, 5f), bore 43' of tube 43 becomes in full registration with inlet and outlet ports 20 and 20'. Then, valve 10 offers a full-bore, through-conduit 43 to the liquid or gas, which sustains only a very negligible pressure drop as it flows through valve 10.

Fluid from inlet port 20 in bonnet 15 flows into valve chamber 34 through the exposed portion of channel 38 in plate 31. From chamber 34, the fluid follows divided paths outside tubular member 43 throughout the entire volume of the pressure-reducing medium 50. The fluid re-combines and flows out through the exposed portion of channel 38' in orifice plate 31' and thence into outlet port 20' in bonnet 16.

Each perforated disc 52 (FIG. 2) subdivides the flow through its holes 55 into a plurality of small flow streams. The inlet orifice plate 31 is sufficiently spaced from orifice 36 so that the entire volume of fluid flowing at any time through orifice 36 will flow through all the perforations 55 of the remaining stack of discs 52.

The inlet and outlet orifices 36 and 36' and flow parts 20, 20' can be of various shapes and combinations, such as full open bores or tapered bores, all of which can be utilized to obtain the desired range of pressure control.

Inlet and outlet orifices 36, 36' can be configured to provide the desired variable pressure drop control, whereby a desired specific output pressure $P_o$ from valve 10 can be maintained. As the line or input pressure $P_i$ to valve 10 changes, the driver mechanism 60 can be made to automatically rotate orifice plates 31 and 31', which will increase or decrease their effective orifice areas, thereby effectively maintaining the desired setpoint, output pressure $P_o$ by rotating towards full-bore the upstream orifice plate 31. By aligning a portion of upstream orifice 36 with bore 43' of tubular member 43 to increase fluid flow, and by reducing the exposed area of channel 38 of the downstream orifice 36' to reduce flow (FIG. 4), it is possible to maintain a desired setpoint, output pressure as line pressures change.

The total pressure drop $P_d$ across valve 10 is the summation of the individual pressure drops through the characterized orifice plates 31, 31' and through the pressure-reducing medium 50. The pressure drops developed across orifices 36 and 36' will vary depending on the orifices' specific shapes and on the upstream pressure at the face of each individual orifice.

Because tube 43 is parallel to and sufficiently radially offset from the axis of rotation 13', any fluid flowing through valve chamber 34 is substantially free from direct interference by tube 43.

Valve 10 will find utility in many industries. For example, a single 8 inch valve can satisfactorily handle approximately the same flow range that would otherwise require an 8 inch conventional plug type control valve paralleled with a 4 inch conventional control valve, or a 6 inch ball valve paralleled with a 3 inch ball valve.

Such dual valve installations would probably require a split range transmitter arrangement, or a manual selection of either valve depending on the required flow rate.

In this respect, a valve 10 with a 315° stem rotation would actually provide better resolution and dynamic stability throughout its entire range of fluid flow, than is possible to obtain with a dual valve arrangement.

Valve 10 also lends itself to become easily incorporated into existing valve utilization systems and methods of using them. The volume of the pressure-reducing medium 50 required for substantially aborting the throttling noise is reduced to a fraction of what is now believed necessary to achieve the same level of noise suppression. Thus, valve 10 adequately fills the long-existing need for optimum noise suppression per volume of pressure-reducing medium employed.

It will be appreciated that the objects set forth above have been accomplished, while other advantages and modifications will become apparent to those skilled in the rotary valve control art.

Other embodiments will readily suggest themselves to those skilled in the art without departing from the scope of this invention as defined by the claims attached hereto.

What I claim is:

1. A rotary control valve, comprising:
   a casing having a center axis and defining a pair of axially-opposed, inlet and outlet ports;
   a valve chamber in said casing, said chamber having a pair of axially-opposed, off-center inlet and outlet orifices operatively and respectively associated with said inlet and outlet ports;
   a valve stem extending through said valve chamber and having an axis of rotation coaxial with said center axis for adjustably rotating said chamber in said casing about said axis of rotation;

each orifice being contiguous to and movable into and out of partial and full registration with its cooperating port, and said orifices being shaped for controlling the flow through said ports;

means including said orifices for providing a predetermined pressure reduction for each adjusted angular position of said valve chamber; and an off-center discharge tube disposed inside said cavity substantially parallel to said stem, and said tube extending between said orifices.

2. A rotary control valve, comprising:

a casing having a longitudinal center axis and defining a generally cylindrical internal receptacle having a pair of inlet and outlet, axially-opposed flow ports;

a rotatable stem extending through said receptacle and having an axis of rotation coaxial with said center axis;

a valve control element disposed inside said receptacle and being mounted on said stem for rotation therewith, said element including a valve chamber having a cylindrical sleeve, an upstream circular plate, and a downstream circular plate, said upstream plate having an inlet orifice and said downstream plate having an outlet orifice, each orifice being suitably shaped to provide a desired flow therethrough in relation to the rotation of said stem; and a tubular member disposed inside said valve chamber and extending between said orifices, said member having a bore whose opposite open ends become in full registration with said inlet and outlet flow ports when said valve chamber is in its fully-open position, and when said valve chamber is in its throttling positions, fluid flows in from said inlet port into said valve chamber through said inlet orifice and follows a path outside said tubular member, and fluid flows out from said valve chamber into said outlet port through said outlet orifice.

3. A rotary control valve, comprising:

a casing defining an internal receptacle having a pair of inlet and outlet flow ports;

a rotatable stem extending through said receptacle;

a valve control element having a valve chamber disposed inside said receptacle and being mounted on said stem for rotation therewith, said valve element including a valve chamber having a cylindrical sleeve, an upstream circular plate, and a downstream circular plate, said upstream plate having an inlet orifice and said downstream plate having an outlet orifice, and each orifice being suitably shaped to provide a desired flow therethrough in relation to the rotation of said stem;

a tubular member disposed inside said valve chamber and extending between said orifices, said member having a bore whose opposite open ends become in full registration with said inlet and outlet flow ports when said valve control element is in its fully-open position; and a driver operatively coupled to said valve for rotating said stem and said valve chamber.

4. The valve of claim 2, wherein each orifice is contiguous to and movable into and out of partial and full registration over its associated port and cooperating therewith to gradually throttle the fluid flow between said ports.

5. The valve of claim 4, wherein each orifice is transverse to the plane of its orifice plate and offset from said center axis, and each orifice defines a near-circular aperture followed by an elongated tapering arcuate channel of gradually restricted width.

6. The valve of claim 5, wherein said tubular member has a straight cylindrical bore of the same diameter as said flow ports, and the opposite open ends of said bore being in full registration with said flow ports when said control element is in its fully-open position, whereby said flow ports and said tubular member form a straight, full-bore flowway having a longitudinal axis which is radially offset from and parallel to said center axis.

7. The valve of claim 6, and a pressure-reducing medium in said valve chamber disposed around and surrounding the external wall of said tubular member, said medium being adapted to cause a tortuous flow therethrough to provide a stepped pressure reduction in the flow through said valve chamber.

8. The valve of claim 7, wherein said pressure-reducing medium includes a plurality of stacked, disc-shaped members spaced from each other to provide a flow path therebetween, each disc-shaped member defining a plurality of axial holes therethrough and a center circular opening, and said tubular member extending through and being secured to the circular openings in said disc-shaped members.

9. The valve of claim 7, wherein said pressure-reducing medium includes a block of material having a plurality of axial holes in the direction of flow and a straight-through, cylindrical center bore, and said tubular member extending through and being secured to said center bore.

10. The valve of claim 8, wherein fluid flowing from said inlet port through its associated channel flows into said valve chamber and follows a path outside said tubular member through the entire volume of said pressure-reducing medium, and flows out through the opposite channel into said outlet port.

11. The valve according to claim 1, wherein each orifice includes a near-circular aperture which is followed by a gradually tapering channel, said discharge tube extending between said apertures, and said valve chamber allowing full-bore fluid flow only through said discharge tube when said apertures in said orifices become opposite to and in full registration with their cooperating ports.

12. The valve according to claim 11, wherein said tapering channel is elongated, arcuate and being defined by walls converging toward their trailing ends.

13. The valve according to claim 1, wherein said means is a pressure-reducing medium disposed in said valve chamber, and the entire medium being operative for dividing the fluid flow through the valve chamber into a plurality of tortuous streams for any adjustable angular throttling position of the valve chamber.

14. The valve according to claim 12, and said means is a pressure-reducing medium disposed in said valve chamber, and the entire medium being operative for dividing the fluid flow through the valve chamber into a plurality of tortuous streams for any adjustable angular throttling position of the valve chamber.

15. The valve according to claim 14, wherein said pressure-reducing medium includes a plurality of stacked, axially-spaced, disc-shaped members, each member having axial holes therethrough of predetermined diameters depending on the desired pressure drop across said medium.

16. The valve according to claim 15, wherein each disc-shaped member includes an off-center bore, and said tube extending through all the bores in said disc-shaped members.

17. The valve according to claim 16, and a drive shaft coupled to for rotating said stem in response to the desired pressure drop across said valve chamber.

18. The valve according to claim 17, wherein said valve chamber has an angular throttling range between 180° and 280°.

19. The valve of claim 17, wherein fluid flowing from said inlet port through its associated channel flows into said valve chamber and follows a path outside said tubular member through the entire volume of said pressure-reducing medium, and flows out through the opposite channel into said outlet port.

20. The valve of claim 14, wherein said pressure-reducing medium has a plurality of balls of a suitable material.

21. The valve of claim 1 wherein said orifices are geometrically distinct.

22. The valve of claim 1, wherein one of said orifices is substantially full-bore throughout its length.

23. The valve of claim 3, and means for adjusting said driver in accordance with line pressure variations to maintain a desired output pressure from said valve.

24. The valve of claim 23, wherein said output pressure is constant.

25. The valve of claim 2 wherein said casing is a split casing to allow the removal of said valve control element therefrom after said casing is installed.

* * * * *